United States Patent [19]
Hirai et al.

[11] Patent Number: 4,639,471
[45] Date of Patent: Jan. 27, 1987

[54] PROCESS FOR PRODUCING POLYESTER POLYURETHANE

[75] Inventors: Koji Hirai; Shunro Taniguchi; Michihiro Ishiguro; Yoshifumi Murata; Shinichi Yokota; Masao Ishii; Noriaki Yoshimura, all of Kurashiki; Takayuki Okamura, Okayama, all of Japan

[73] Assignee: Kuraray Co., Ltd., Kurashiki, Japan

[21] Appl. No.: 826,595

[22] Filed: Feb. 6, 1986

[30] Foreign Application Priority Data

Feb. 12, 1985 [JP] Japan .................................. 60-25428

[51] Int. Cl.$^4$ .............................................. C08G 18/14
[52] U.S. Cl. .................................... 521/172; 521/173; 528/81; 528/83
[58] Field of Search .................. 521/172, 173; 528/81, 528/83

[56] References Cited

U.S. PATENT DOCUMENTS 3,853,821 12/1974 Sid-Ahmed et al. ................. 528/83
4,420,601 12/1983 Kuroda et al. ........................ 528/83

Primary Examiner—Maurice J. Welsh
Attorney, Agent, or Firm—Oblon, Fisher, Spivak, McClelland & Maier

[57] ABSTRACT

A process for producing a novel polyester polyurethane having excellent hydrolysis resistance and excellent flexibility at low temperature, which is obtained from a polyisocyanate and a polyester polyol which is obtained by reaction a dicarboxylic acid with a mixture of 1,9-nonanediol and a polyol represented by the formula

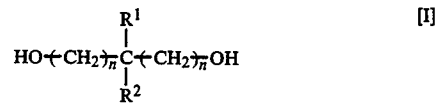

wherein $R^1$ denotes methyl group or ethyl group, $R^2$ denotes hydrogen atom, methyl group, ethyl group, hydroxymethyl group or hydroxyethyl group, and n is an integer of 1 to 5, said polyester polyol having an average molecular weight of 500 to 30,000.

10 Claims, No Drawings

PROCESS FOR PRODUCING POLYESTER POLYURETHANE

BACKGROUND OF THE INVENTION

The present invention relates to a process for producing a novel polyester polyurethane from a polyester polyol and a polyisocyanate. More particularly, it relates to a process for producing a polyester polyurethane which has an excellent hydrolysis resistance and keeps its good flexibility under a low temperature atmosphere.

Heretofore, polyurethanes have been produced from a high-molecular weight polyol and a polyisocyanate and, optionally, a low-molecular weight compound having two or more active hydrogen atoms. The high-molecular weight polyol includes, for example, polyester polyols and polycaprolactone polyols. The former are formed by the polycondensation reaction of a dicarboxylic acid such as an aliphatic dicarboxylic acid including succinic acid, glutartic acid, adipic acid, azelaic acid or sebacic acid with a glycol such as ethylene glycol, propylene glycol, 1,4-butanediol neopentyl glycol or 1,6-hexanediol (See "Polyurethane Resin", pp. 56-61, by Keiji Iwata, published by Nikkan Kogyo Shinbunsha, July 30, 1975).

When the above-mentioned polyester polyol or polycaprolactone polyol is used as the high-molecular weight polyol, the resulting polyurethane is poor in hydrolysis resistance, and therefore, it has a sticky surface or cracked surface when it is made into film. Because of this poor property, the applications of such a polyurethane are considerably limited. The hydrolysis resistance of the polyurethane can be effectively improved by reducing the amount of the ester groups of the polyester polyol residues in the polyurethane. This is achieved by using as the high-molecular weight polyol a polyester polyol obtained from a glycol having a large number of carbon atoms and a dicarboxylic acid. A polyurethane obtained from such a polyol is improved in hydroylsis resistance, but has a high degree of crystallinity which leads to an extremely decreased flexibility. In other words, it is very poor in flex resistance in an atmosphere at low temperature, e.g., −20° C.

SUMMARY OF THE INVENTION

It is a object of the present invention to provide a process for producing a novel polyester polyurethane from a polyester polyol and a polyisocyanate.

It is an another object of the present invention to provide a process for producing a polyester polyurethane which has an improved hydrolysis resistance and flexibility at low temperatures (e.g., −20° C.).

According to the present invention, the above-mentioned objects are achieved by a process for producing polyester polyurethane from a high-molecular weight polyol and a polyisocyanate, wherein the improvement comprises using as the high molecular weight polyol a polyester polyol which is obtained by reacting a dicarboxylic acid with a mixture of 1,9-nonanediol and a polyol represented by the formula

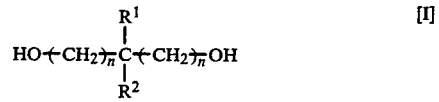

wherein $R^1$ denotes methyl group or ethyl group, $R^2$ denotes hydrogen atom, methyl group, ethyl group, hydroxymethyl group or hydroxyethyl group, and n is an integer of 1 to 5, said polyester polyol having an average molecular weight of 500 to 30,000.

DETAILED DESCRIPTION OF THE INVENTION

In the present invention, it is very important to use as polyol a polyester polyol obtained from a dicarboxylic acid and a mixture of 1,9-nonanediol and a polyol represented by the formula [I] (referred to as polyol [I] hereinafter). In the formula, $R^1$ and $R^2$ are preferably methyl group and hydrogen atom, respectively, and n is preferably 1 or 2. Preferred examples of the polyol [I] include diols having 3 to 6 carbon atoms such as 2-methyl-1,3-propanediol, neopentyl glycol and 3-methyl-1,5-pentanediol, and triols such as trimethylolpropane. When 3-methyl-1,5-pentanediol and 1,9-nonanediol are used together, it is possible to produce a polyurethane having a improved hydrolysis resistance and flexiblity at low temperatures and further good mechanical properties.

In the mixture composed of 1,9-nonanediol and the polyol [I], the former may account for 40% by weight and above, preferably in the range of 40 to 95% by weight, more preferably 50 to 90% by weight, depending on the type of polyol [I]. Where the polyol [I] is a polyol having 6 or more carbon atoms such as 3-methyl-1,5-pentanediol, the amount of 1,9-nonanediol is preferably in the range of 45 to 90% by weight of the mixture. Where the polyol [I] is a polyol having 5 or less carbon atoms such as neopentyl glycol or 2-methyl-1,3-propanediol, the amount of 1,9-nonanediol is preferably in the range of 80 to 90% by weight. If the amount of 1,9-nonanediol is low, the resulting polyurethane is poor in hydrolysis resistance. On the other hand, if the ratio of polyol [I] is excessively low, the resulting polyurethane is not sufficiently flexible at low temperatures. Incidentally, the above-mentioned mixture may be incorporated with a small amount (say, less than 5% by weight) of the low alkylene glycols such as ethylene glycol, propane glycol or 1,4-butanediol.

The dicarboxylic acid used for producing the polyester polyol in this invention is preferably an aliphatic or aromatic dicarboxylic acid having 5 to 12 carbon atoms, an aliphatic one being preferable. Examples of aliphatic dicarboxylic acids include glutaric acid, adipic acid, pimelic acid, suberic acid, azelaic acid, and sebacic acid; and examples of aromatic dicarboxylic acids include phthalic acid, terphthalic acid, and isophthalic acid. For the production of polyurethanes superior in hydrolysis resistance and flexibility at low temperatures, adipic acid, azelaic acid, and sebacic acid are preferable, and especially azelaic acid is most preferable. These acids may be used individually or in combination with one another.

The polyester polyol used in this invention can be produced by the similar process as the known one in the production of polyethylene terephthalate or polybutylene terephthalate, namely, the ester interchange process or the direct esterification and subsequent melt polycondensation reaction. The polyester polyol may have an average molecular weight in the range of 500 to 30,000, preferably 600 to 8,000. The number of hydroxyl groups in the polyester polyol may be 2 or more, preferably 2 to 4, depending on the intended application of the resulting polyurethane.

The polyisocyanate used in this invention is a known aliphatic, alicyclic, or aromatic organic polyisocyanate having 2 or more isocyanate groups in the molecule. Examples of the polyisocyanates include a diisocyanate such as 4,4'-diphenylmethane diisocyanate, p-phenylene diisocyanate, toluylene diisocyanate, 1,5-naphthylene diisocyanate, xylylene diisocyanate, hexamethylene diisocyanate, isophorone diisocyanate, and 4,4'-dicyclohexylmethane diisocyanate; and triisocyanates such as adducts formed by adding 3 mole of toluylene diisocyanate to 1 mole of trimethylolpropane or glycerin.

In this invention, a proper chain extender which is commonly used in the polyurethane industry may be used if required. It is a low-molecular weight compound of molecular weight lower than 400 having at least two hydrogen atoms that react with isocyanate groups. Examples of such compounds include ethylene glycol, 1,4-butanediol, xylylene glycol, bishydroxyethylbenzene, neopentyl glycol, 3,3'-dichloro-4,4'-diaminophenylmethane, isophorone diamine, 4,4'-diaminodiphenylmethane, hydrazine, dihydrazine, trimethylolpropane, and glycerin.

The polyurethane in this invention can be produced by the known polyurethane technologies. For example, it is prepared by the steps of preheating a polyester polyol or a mixture of a polyester polyol and a low-molecular weight compound having active hydrogen atoms at about 40° to 100° C., adding a polyisocyanate in such an amount that the ratio of the isocyanate groups in the polyisocyanate to the nubmer of active hydrogen atoms in the polyester polyol and/or the low molecular weight compound, vigorously stirring the reactants for a short time, and allowing the resulting mixture at about 50° to 150° C. The prepolymer process can be also employed. The polyisocyanate is generally used in a small excess because it is reactive to moisture. The polyurethane-forming reaction may be carried out in a solvent such as dimethylformanide, diethylformamide, dimethylsulfoxide, dimethylacetamide, tetrahydrofuran, isopropanol, benzene, toluene, ethyl-cellosolve, and trichloroethylene, and a mixture thereof. The concentration of polyurethane in the solution may be 10 to 40% by weight so that a high-molecular weight polyurethane is advantageously obtained.

The resulting polyurethane may have an average molecular weight of 5,000 to 500,000, preferably 10,000 to 300,000.

The polyurethanes produced by the process of this invention will find a variety of uses. Some of them are listed below.

(1) The resulting polyurethane is a substantially linear thermoplastic polyurethane. It is made into pellets, which are formed into elastomer products by injection molding, extrusion molding, or calendering.

(2) The resulting polyurethane is cast elastomer products, paints, or adhesives. It is produced by mixing a polyester polyol, polyisocyanate, and chain extender together, or by the prepolymer process. In the latter case, a polyester polyol and a polyisocyanate are previously reacted to give a prepolymer having terminal isocyanate groups or terminal hydroxyl groups, and this prepolymer is mixed with a chain extender or a polyisocyanate.

(3) The resulting polyurethane is dissolved in a solvent, or the synthesis of polyurethane is accomplished in a solvent, and the polyurethane solution thus obtained is used as a coating material, impregnant, or modifier for artificial leathers and textile products.

(4) The terminal-isocyanate prepolymer is dissolved in a solvent, and the solution is incorporated with a chain extender to give a stable spinning solution. Elastic fibers are produced from this spinning solution by wet process or dry process.

(5) The polyester polyol is incorporated with a foaming agent and other additives, and to the resulting blend is added a polyisocyanate or prepolymer having terminalisocyanate groups with vigorous stirring to bring about foaming, whereby producing a foam product.

The polyurethane obtained by the process of this invention will find use as sheet, film, roll, gear, solid tire, belt, hose, tube, vibration isolator, packing, shoe sole (microcellular), artificial leather, fiber treatment, cushioning material, paint, adhesive, sealant, water proofing agent, flooring material, and elastic fiber.

EXAMPLE

The invention is now illustrated by the following Examples and Comparative Examples, but should not be construed to be limited thereto. In the Examples, the various properties of polyurethane were measured by the following methods.

(1) Hydrolysis Resistance

A polyurethane film having a thickness of 60 um was subjected to an accelerated hydrolysis test in hot water at 100° C. for 4 weeks, and then, the remaining film was dissolved in a mixture solvent of dimethylformamide and toluene (7/3 by weight). The retaining ratio of logarithmic viscosity number (the ratio of logarithmic viscosity in mixture solvent before and after the test) was measured.

(2) Cold Resistance

A test piece having a thickness of 0.2 mm was prepared, and then, a glass transition point (Tg) was measured with direct-reading dynamic viscoelasticity meter (110 Hz Vibron Model DDV-II, manufactured by Toyo Sokki Co., Ltd., Japan).

(3) Flex Resistance

A polyurethane solution was coated onto an artificial leather ("Clarino" ®, manufactured by Kuraray Co., Ltd., Japan) and dried so as to provide the dry thickness of 20 μm. Flexibility resistance was measured with flexing machine (stroke width: maximum 3 cmm, minimum 1 cm) having flexing pitch 8,600 cycles/hour at a temperature of −20° C. by bending the specimen 100,000 times. The surface of the polyurethane film is visually examined, and the result is expressed in three ranks. If the film is broken and damaged to such an extent that the substrate is seen, the flexibility is regarded as being poor (indicated by "xxx" in Table 2). If the film is slightly damaged, the flexibility is regarded as being insufficient (indicated by "xx" in Table 2). If the film is substantially undamaged, the flexibility is regarded as being good (indicated by "x" in Table 2).

The compounds used in the Examples are represented by the codes shown in Table 1.

TABLE 1

| Code | Compound |
| --- | --- |
| 1,9-ND | 1,9-nonanediol |
| 1,6-HD | 1,6-hexanediol |
| 1,4-BD | 1,4-butanediol |
| 3-MPD | 3-methyl-1,5-pentanediol |
| 2-MPD | 2-methyl-1,3-propanediol |
| NPG | neopentyl glycol |
| AD | adipic acid |
| AZ | azelaic acid |
| MDI | 4,4'-diphenylmethane diisocyanate |

EXAMPLE 1

Into a reactor equipped with a stirrer were charged 1280 parts by weight of 1,9-ND, 236 parts by weight of 3-MPD, and 1030 parts by weight of adipic acid (AD). Esterification was performed at 190° to 200° C. with continuous removal of water by distillation under a nitrogen stream at normal pressure. When the acid value of the polyester formed decreased below 1, the reaction system was gradually evacuated to complete the reaction. According to NMR analysis, the resulting polyester was an adipate-copolymerized polyester diol containing 1,9-ND and 3-MPD units at a ratio of 7:3 (by weight). This product is referred to as polyester polyol A hereinafter. It has a hydroxyl number of 56.2, and acid value of 0.25, and a molecular weight of 2,000.

2,000 parts by weight of the polyester polyol A, 90 parts by weight of 1,4-BD (as chain extender), and 1,000 parts by weight of MDI were dissolved in a mixture solvent of dimethylformamide and toluene (7/3 by weight) to make 30% by weight of solution. The molar ratio of the polyester A/1,4-BD/MDI was 1/3/4. The reactants in the solution were allowed to react with one another under a nitrogen stream until the solution viscosity at 70° C. reached 1,000 poise. The molecular weight of the resulting polyurethane was 145,000.

According to the evaluation test of the resulting polyurethane, the retaining ratio of logarithmic viscosity (as a measure of hydrolysis resistance) was 69%, and no damages were found on the surface of the film (See Table 3). From this, it is clear that the polyurethane has a good hydrolysis resistance and flexibility at −20° C. The polyurethane has a good mechanical properties, too (See Table 3).

EXAMPLES 2 TO 9 AND COMPARATIVE EXAMPLES 1 to 5

Several kinds of polyester diols (designated as polyester polyols B to N) were produced in the same manner as in Example 1, except that diols and dicarboxylic acids as specified in Table 2 were used. Each polyester polyol was used in an amount equal to the parts by weight indicated by its molecular weight. The resulting polyurethane was examined for hydrolysis resistance, flexibility at low temperature and mechanical properties. The results are shown in Table 3.

TABLE 2

| Example No. | Code | Preparation of polyester diol | | | Physical properties of polyester diol | | |
| --- | --- | --- | --- | --- | --- | --- | --- |
| | | Diol (X) | Diol (Y) | Acid | Ratio of (X)/(Y) | Molecular weight | Acid value |
| 1 | A | 1,9-ND | 3-MPD | AD | 7/3 | 2000 | 0.25 |
| 1* | B | 1,9-ND | — | AD | — | 2010 | 0.23 |
| 2 | C | 1,9-ND | 3-MPD | AD | 8/2 | 1978 | 0.19 |
| 3 | D | 1,9-ND | 2-MPD | AD | 8/2 | 1985 | 0.31 |
| 4 | E | 1,9-ND | NPG | AD | 8/2 | 2000 | 0.30 |
| 2* | F | 1,6-HD | NPG | AD | 8/2 | 2010 | 0.30 |
| 3* | G | 1,4-BD | — | AD | — | 2015 | 0.18 |
| 4* | H | 1,9-ND | — | AZ | — | 1990 | 0.28 |
| 5 | I | 1,9-ND | 3-MPD | AZ | 8/2 | 1980 | 0.15 |
| 6 | J | 1,9-ND | 3-MPD | AZ | 8/2 | 2010 | 0.31 |
| 5* | K | 1,4-BD | — | AZ | — | 2015 | 0.29 |
| 7 | L | 1,9-ND | 3-MPD | AD | 5/5 | 2000 | 0.21 |
| 8 | M | 1,9-ND | 3-MPD | AZ | 5/5 | 2000 | 0.15 |
| 9 | N | 1,9-ND | NPG | AD | 5/5 | 2000 | 0.13 |

*Comparative Examples

TABLE 3

| Example No. | Code | Physical properties of polyurethane | | | | |
| --- | --- | --- | --- | --- | --- | --- |
| | | Hydrolysis resistance | Cold resistance | Flex resistance | Tensile strength | Elongation |
| 1 | A | 69% | −31° C. | x | 730 kg/cm² | 520% |
| 1* | B | 72 | −13 | xxx | 560 | 380 |
| 2 | C | 70 | −29 | x | 750 | 510 |
| 3 | D | 54 | −24 | xx | 620 | 480 |
| 4 | E | 58 | −20 | xx | 600 | 490 |
| 2* | F | 28 | −20 | xx | 500 | 480 |
| 3* | G | 24 | −24 | xx | 620 | 490 |
| 4* | H | 92 | −13 | xxx | 520 | 340 |
| 5 | I | 91 | −32 | x | 750 | 500 |
| 6 | J | 87 | −32 | x | 740 | 500 |
| 5* | K | 30 | −24 | xx | 630 | 400 |
| 7 | L | 71 | −35 | x | 790 | 560 |
| 8 | M | 90 | −39 | x | 780 | 580 |
| 9 | N | 46 | −22 | xx | 600 | 520 |

What is claimed is:

1. In a process for producing a polyester polyurethane from a high-molecular weight polyol and a polyisocyanate, the improvement which comprises using as said polyol a polyester polyol which is obtained by reacting a dicarboxylic acid with a mixture of 1,9-nonanediol and a polyol represented by the formula

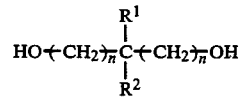

[I]

wherein $R^1$ denotes methyl group or ethyl group, $R^2$ denotes hydrogen atom, methyl group, ethyl group, hydroxymethyl group or hydroxyethyl group, and n is an integer of 1 to 5, said polyester polyol having an average molecular weight of 500 to 30,000.

2. A process according to claim 1, wherein the dicarboxylic acid is an aliphatic or aromatic acid having 5 to 12 carbon atoms.

3. A process according to claim 1, wherein the dicarboxylic acid is an aliphatic acid having 5 to 12 carbon atoms.

4. A process according to claim 1, wherein the dicarboxylic acid is adipic acid, azelaic acid or sebacic acid.

5. A process according to claim 1, wherein the dicarboxylic acid is azelaic acid.

6. A process according to claim 1, wherein the polyol represented by the formula [I] is a polyol having 3 to 6 carbon atoms.

7. A process according to claim 1, wherein the polyol represented by the formula [I] is 2-methyl-1,3-propanediol, neopentyl glycol, 3-methyl-1,5-pentanediol or trimethylolpropane.

8. A process according to claim 1, wherein the polyol represented by the formula [I] is 3-methyl-1,5-pentanediol.

9. A process according to claim 1, wherein the mixing ratio of 1,9-nonanediol in the mixture is in the range of 40 to 95% by weight.

10. A process according to claim 1, wherein the amount of the high-molecular weight polyol and the polyisocyanate is such that the ratio of the number of isocyanate groups in the polyisocyanate to the number of hydroxyl groups in the high-molecular weight polyol in the range of 0.8/1 to 8/0.

* * * * *